United States Patent [19]

Buscall et al.

[11] Patent Number: 5,002,601

[45] Date of Patent: Mar. 26, 1991

[54] SUSPENSION FERTILIZERS

[75] Inventors: Richard Buscall, Chester; Ian J. McGowan, Halewood Liverpool, both of England

[73] Assignee: Imperial Chemical Industries PLC, London, England

[21] Appl. No.: 523,270

[22] Filed: May 14, 1990

Related U.S. Application Data

[63] Continuation of Ser. No. 250,993, Sep. 27, 1988, abandoned, which is a continuation of Ser. No. 818,761, Jan. 14, 1986, abandoned.

[30] Foreign Application Priority Data

Jan. 31, 1985 [GB] United Kingdom ............... 8502450

[51] Int. Cl.$^5$ .................. C05C 9/00; C05C 11/00; C05G 1/00; C05G 3/00
[52] U.S. Cl. ........................... 71/28; 71/29; 71/30; 71/63; 71/64.07; 71/64.08; 71/34
[58] Field of Search ............... 71/27, 63, 64.07, 64.08, 71/28–30, 34

[56] References Cited

U.S. PATENT DOCUMENTS

| | | | |
|---|---|---|---|
| 3,234,005 | 2/1966 | Smelter et al. | 71/64.08 |
| 4,265,406 | 5/1981 | Palgrave et al. | 241/16 |
| 4,356,021 | 10/1982 | Kenton | 71/64.08 X |
| 4,367,104 | 1/1983 | Paton et al. | 149/7 |
| 4,375,980 | 3/1983 | Jones et al. | 71/64.08 X |
| 4,482,372 | 11/1984 | Palgrave et al. | 71/64.08 X |
| 4,525,197 | 6/1985 | Eibner et al. | 71/11 |

FOREIGN PATENT DOCUMENTS

55-37518 9/1980 Japan .

*Primary Examiner*—Ferris H. Lander
*Attorney, Agent, or Firm*—Cushman, Darby & Cushman

[57] ABSTRACT

A process for preparing suspension fertilizers wherein nutrient material and at least one crystal growth inhibitor are mixed, potassium chloride is added, the resultant slurry mixed and subsequently a suspending aid, for example a clay, is added with mixing.

8 Claims, No Drawings

SUSPENSION FERTILIZERS

This is a continuation of application Ser. No. 07/250,993, filed Sept. 27, 1988 which is a continuation of Ser. No. 06/818,761, filed Jan. 14, 1986, both now abandoned.

This invention relates to suspension fertilisers and to a process for their preparation.

Suspension fertilisers are suspensions of small crystals in a mother liquor which (a) comprises fertiliser material and (b) is saturated with respect to the fertiliser material of which the small crystals are comprised; they contain at least one of N, P and K (and often trace elements) in prearranged ratios for various agricultural applications. Sources of nitrogen in such suspension fertilisers include inter alia ammonium nitrate, ammonium phosphate, ammonium sulphate and urea. Sources of phosphorus in such suspension fertilisers include inter alia ammonium phosphate, phosphoric acid, superphosphate, triple super phosphate and calcium phosphate, typically having a Ca/P ratio between 0.5 and 1.5. Sources of potassium in such suspension fertilisers include inter alia potassium nitrate, potassium chloride, potassium sulphate and potassium hydroxide.

The crystals readily deposit from the suspension unless it is continuously agitated and there is also a tendency for crystal growth to continue within a suspension fertiliser after it has been formulated. The storage instability of such suspension fertilisers leads to (a) the formation of heavy deposits in storage tanks, which deposits are difficult to redisperse, and (b) blockage of pipes, nozzles and jets in spraying equipment.

To improve the storage stability of suspension fertilisers a non-swelling clay, e.g. attapulgite, is commonly added. Recently, to improve further the storage stability of such suspension fertilisers the addition of various further additives, for example carboxymethylcellulose, tetrasodium pyrophosphate, ferro-cyanides and water-soluble dyestuffs which may act as suspension aids and/or crystal modifiers has been proposed.

We have now found that by careful choice of additives and of the method and order of addition used in the preparation of suspension fertilisers, suspension fertilisers of improved storage stability may be prepared. We have also found that where suspension fertilisers contain suspended potassium chloride crystals together with dissolved nitrate ions, additives which prevent both the growth of potassium chloride crystals and potassium nitrate crystals must be added in order to obtain suspension fertilisers of good storage properties. Furthermore, we have found that swellable clays, e.g. bentonite, may be used as suspending aids provided that they are pre-swollen in an aqueous medium which is preferably water.

Accordingly the present invention provides a process for preparing a suspension fertiliser which comprises the steps:
(i) mixing nutrient material with at least one crystal growth inhibitor;
(ii) mixing potassium chloride with the mixture prepared in step (i); and
(iii) mixing a suspending agent with the mixture prepared in step (ii).

The nutrient material used in step (i) of the above process comprises phosphorus and/or nitrogen. Examples of nitrogen-containing nutrient material include ammonia (anhydrous or aqueous), metal nitrate, metal nitrite, ammonium nitrate and urea. Examples of phosphorus-containing nutrient material include phosphoric acid, triple superphosphate, metal phosphate and metal hydrogen phosphates. Further examples of nutrient material are ammonium phosphate and metal ammonium phosphates. Mixtures of all of the above are within the present invention. Optionally further nutrient materials may be present, such as sulphur and magnesium compounds.

The term "ammonium phosphate" includes mixtures of diammonium hydrogen phosphate and ammonium dihydrogen phosphate in, for example, a molar ratio of about 2:1, and also includes ammonium polyphosphate. Conveniently the ammonium phosphate is derived from "wet-process" phosphoric acid or "merchant-grade" phosphoric acid by methods known in the art.

The nutrient material used in step (i) is conveniently in the form of an aqueous solution. However, in the production of fertilisers from "wet-process" phosphoric acid, a by-product is produced which contains salts formed from impurities present in the "wet-process" acid. These salts are mainly salts of iron, aluminium and magnesium and are obtained as a slurry of particles suspended in an ammonium phosphate liquor. Such a slurry can be used in the process of the present invention, thus providing an additional source of nutrients.

The concentration of ammonium phosphate, where present, in an aqueous solution when used in step (i); is suitably between 0.1% $^w$/w and 50% $^w$/w, preferably between 30–45% $^w$/w (at approximately neutral pH) and suitably between 0.1% $^w$/w and 25% $^w$/w (at low pH values).

The concentrations of ammonium nitrate and urea, where present, in an aqueous solution when used in step (i), are suitably between 0.1–47% (preferably 0.1–20% $^w$/w) and 0.1–40% $^w$/w respectively.

Suitable crystal growth inhibitors used in step (i) of the process of the present invention include ferrocyanide salts, ferricyanide salts, polyphosphates, hexametaphosphates (wherein the phosphorus atoms can be present in linear, branched-chain or ring form), metavanadates, sulphonated mono-, bi- and poly- nuclear aromatic compounds, sulphonated dyes, sulphonated polymers, aminated polymers, polyacrylic acids, borax, cadmium chloride, lead chloride, sorbitol, polyvinyl alcohol, caseinate and soluble starch hydrolysate. More suitably the crystal growth inhibitors are potassium or sodium ferrocyanide, a polyphosphate, a salt of β-naphthol sulphonic acid condensed with formaldehyde such as the sodium, potassium or ammonium salt, or sodium or potassium hexametaphosphate.

Suitable polyphosphates include sodium polyphosphate, tetrasodium diphosphate, sodium tripolyphosphate and various polyphosphates in the form of glasses. Preferably the polyphosphates marketed under the Trade Mark 'CALGON' (Albright and Wilson) are used as crystal growth inhibitors.

Ferrocyanide salts, for example sodium ferrocyanide and potassium ferrocyanide are preferred crystal growth inhibitors.

It will be appreciated that where suspension fertilisers contain potassium ions and nitrate ions there will be a tendency for potassium nitrate crystals to grow, even where potassium nitrate per se has not been used in the preparation of the suspension fertiliser.

Where nitrates are present in the suspension fertiliser and the temperature under which the suspension fertiliser is stored is not kept substantially constant, then a suitable crystal growth inhibitor, other than ferrocyanide, is necessary.

It will be appreciated that temperature increase may cause suspended solids to dissolve and subsequent temperature decrease may cause crystallisation on cooling.

In a preferred aspect we have found the presence of a polyphosphate to be advantageous for maintaining desirable suspension characteristics of fertiliser containing nitrate when subjected to temperature fluctuations over a period of time.

The concentrations of ferrocyanide and polyphosphate, where used, in the mixture produced in step (i) of the process are suitably between 0.05 and 0.5% w/w and 0.05 and 0.5% w/w respectively.

Optionally a polymeric additive is incorporated in step (i) of the process to facilitate redispersion should any syneresis occur.

By the term "polymeric additive" is meant an organic polymer which is soluble in the aqueous solution or slurry used in step (i) and which does not react adversely with any of the components of the suspension fertiliser. Examples of such additives are polyethylene glycol, for example of molecular weight of about 6000, and carboxymethylcellulose salts for example the sodium salt.

The concentration of the polymeric additive, where present, in the mixture prepared in step (i) of the process is typically between 0.05 and 0.5% w/w.

Generally potassium chloride is used in step (ii) of the process of the present invention in the form of crystals.

Mixing, in step (ii) of the process of the present invention, is suitably performed by milling. Conveniently this operation is carried out in a mill capable of reducing the particle size of the potassium chloride to the range of 50 to 500 microns. This is preferably carried out in a colloid mill. Typically the mixture is passed through the mill two or three times. The particle size distribution preferably has the maximum at less than 500 microns.

The concentration of potassium chloride in the mixture produced in step (ii) of the process of the present invention is typically between 0.1 and 50% w/w.

Suitably the suspending agent for use in step (iii) is silica or preferably a clay. Examples of suitable clays include acicular habit attapulgite or preferably a swellable clay, e.g. a magnesium alumino-silicate, which may be synthetic, or preferably, for reasons of cost, naturally occurring, more preferably bentonite (montmorillonite) in its sodium form.

Where bentonite (montmorillonite) is used it is added in the form of a pre-swollen suspension in an aqueous medium, preferably water. Typically a mixture of bentonite (montmorillonite) and water is mixed in a high shear mixer and then allowed to stand, typically for about 24 hours. The pre-swollen suspension typically comprises about 1 part by weight of bentonite (montmorillonite) to about 5 parts by weight of water.

Mixing, in step (iii) of the process according to the present invention, is preferably carried out in a colloid mill. Typically one pass through the mill is sufficient to form a storage stable suspension fertiliser.

The suitable clay generally provides less than 10%, for example 1–10% and usually less than 5% w/w of the suspension fertiliser, and more suitably provides between 1 and 4% w/w.

The invention is further illustrated with reference to the following examples.

EXAMPLES 1–12

General Procedure

Crystal growth inhibitors were dissolved in an aqueous solution of nutrient material: Solution A was obtained. Potassium chloride, sufficient to provide 45% w/w of the suspension fertiliser, was added to Solution A and the mixture was passed three times through a colloid mill: Mixture B was obtained.

A suspension (15% w/w) of pre-swollen sodium bentonite in water was prepared by stirring bentonite in water for 3 minutes and then allowing the mixture to stand for 24 hours (Suspension C).

A portion of Suspension C was added to a portion of Mixture B and the resulting mixture was passed through a colloid mill three times to form a suspension fertiliser which was stored for 6 months at ambient temperature.

In a first comparative test (CT1) potassium chloride crystals and a portion of Suspension C were mixed and then added to Solution A. The results in Table 1 show the importance of the process of this invention.

In second and third comparative tests (CT2 and CT3) crystal growth inhibitors employed did not include sodium polyphosphate.

In a fourth comparative test, commercial-grade bentonite as obtained was added to a portion of Mixture B; the bentonite remaining in clumps and a suspension fertiliser could not be formed, showing the advantage of pre-swollen bentonite.

TABLE 1

| Example No. | Nutrient Material | Inhibitors[b] E | F | Polymeric[b] additive G | H | Bentonite (%)[a] | Syneresis[c] (%) | Crystal Growth | Crystal Deposition[d] |
| --- | --- | --- | --- | --- | --- | --- | --- | --- | --- |
| 1 | Z | 0.1 | 0.3 | 0.2 | 0 | 1.5 | 5 | No | No |
| 2 | Z | 0.1 | 0.3 | 0.2 | 0 | 2.0 | 5 | No | No |
| 3 | Z | 0.1 | 0.3 | 0.2 | 0 | 2.5 | 0 | No | No |
| 4 | Z | 0.1 | 0.3 | 0.2 | 0 | 3.0 | 0 | No | No |
| 5 | Z | 0.1 | 0.3 | 0.2 | 0 | 1.0 | 25 | No | No |
| 6 | Z | 0.1 | 0.3 | 0.2 | 0 | 1.4 | 25 | No | No |
| 7 | Z | 0.1 | 0.3 | 0 | 0.2 | 1.5 | 5 | No | No |
| 8 | W | 0.1 | 0.3 | 0.2 | 0 | 1.5 | 5 | No | No |
| 9 | Z | 0.1 | 0.3 | 0 | 0 | 1.0 | 25 | No | No |
| 10 | Z | 0.1 | 0.3 | 0 | 0 | 1.5 | 5 | No | No |
| 11 | Z | 0.1 | 0.3 | 0 | 0 | 3.0 | 0 | No | No |
| 12 | W | 0.1 | 0.3 | 0 | 0 | 1.5 | 5 | No | No |
| CT 1 | Z | 0.1 | 0.3 | 0.2 | 0 | 2.0 | 25 | No | Yes |
| CT 2 | Z | 0.1 | 0 | 0.2 | 0 | 1.5 | 5 | Yes | Yes |

TABLE 1-continued

| Example No. | Nutrient Material | Inhibitors[b] E | F | Polymeric[b] additive G | H | Bentonite (%)[a] | Syneresis[c] (%) | Crystal Growth | Crystal Deposition[d] |
| --- | --- | --- | --- | --- | --- | --- | --- | --- | --- |
| CT 3 | Z | 0.1 | 0 | 0.2 | 0 | 2.0 | 5 | Yes | Yes |

Symbols used in TABLE 1
E: Potassium ferrocyanide.
F: Sodium polyphosphate (Calgon).
G: Sodium carboxymethylcellulose.
H: Polyethylene glycol M. Wt. 6000.
W: 35% w/w "ammonium phosphate".
X: W saturated with ammonium nitrate.
Y: W saturated with urea.
Z: Mixture of equal volumes of X and Y.
[a]: As % w/w of suspension fertiliser.
[b]: As % w/w of nutrient medium.
[c]: % v/v of clear supernatant liquid based on total volume of composition, on shaking a suspension reformed.
[d]: Sediment of potassium chloride and/or potassium nitrate crystals.
CT 1: First comparative test, poor quality dispersion is obtained.
CT 2: Second comparative test.
CT 3: Third comparative test.

EXAMPLE 13

This Example illustrates the effect of altering the concentration of clay on the sedimentation properties of suspension fertilisers prepared by the process according to the present invention.

The general procedure of Examples 1–12, was repeated using the concentrations of Example 4 except that the concentration of bentonite was varied and the fertiliser compositions were stored for 25 days.

TABLE 2

| Example No. | Concentration of Bentonite | Syneresis (% v/v) |
| --- | --- | --- |
| 13 | 3.0 | 0 |
|  | 2.5 | 5 |
|  | 2.0 | 10 |
|  | 1.5 | 35 |
|  | 1.0 | 50 |
|  | 0.75 | 75 |

The results are shown in Table 2. In Example 13, at bentonite concentrations from 1.0 to 3.0%, the sediment could be readily redispersed to reform a suspension fertiliser; in comparative tests at a bentonite concentration of 0.75%, potassium chloride had been deposited as a layer below the bentonite and could not be redispersed.

EXAMPLE 14

This example illustrates the stability to temperature cycling of suspension fertilisers which are prepared by the process of the present invention and contain a ferrocyanide and a polyphosphate.

A suspension fertiliser was prepared by the process of the present invention having the composition indicated in Example 2. A first portion thereof was maintained at room temperature for 10 days and a second portion thereof was cycled between −5° C. and +40° C. for 10 days, each cycle took 24 hours.

In comparative tests (CT4 and Example 17) the polyphosphate was omitted from the preparation of the suspension fertiliser. This shows that at constant temperature the presence of polyphosphate is not necessary to achieve desirable characteristics.

The results are shown in Table 3.

TABLE 3

| Example No. | Concentration[a] of polyphosphate | Temperature | Crystal growth |
| --- | --- | --- | --- |
| 15 | 0.3 | A | No |
| CT 4 | 0 | A | Yes |
| 16 | 0.3 | B | No |
| 17 | 0 | B | No |

[a]: As % w/w of nutrient medium.
A: Cycled between −5° C. and +40° C. for 10 days, each cycle took 24 hours.
B: 20° C. constant temperature.

EXAMPLES 18–26

These Examples illustrate the use of attapulgite as the clay in the process according to the present invention.

Examples 1–8 were repeated except that attapulgite was used instead of bentonite and at twice the concentration at which bentonite had been used.

Results similar to those shown in Table 1 were obtained.

EXAMPLE 27

Potassium ferrocyanide (0.1 parts) and polyethylene glycol (M. Wt. 6000) (0.2 parts) were dissolved in ammonium phosphate liquor (8-24-0) (39 parts); "wet-process" phosphoric acid (11.1 parts) and water (4.6 parts) were added to adjust the $N:P_2O_5$ ratio to 1:5. Potassium chloride (25 parts) was added with continuous agitation to the solution to form a slurry. This was passed several times through a mill to reduce the particle size. Preswollen sodium bentonite clay (15% dispersion in water; 20 parts) was added to the slurry and this was passed through a mill several times. The resultant suspension was transferred to a storage tank.

EXAMPLE 28

Potassium ferrocyanide (0.1 parts) and polyethylene glycol (M. Wt. 6000) (0.2 parts) were added to water (32.4 parts) with agitation. To this solution was added triple superphosphate (31.1 parts) and subsequently potassium chloride (22.8 parts). The mixture was continuously agitated during the addition. The resultant slurry was passed several times through a mill to reduce the particle size. Preswollen sodium bentonite clay (15% dispersion in water; 13.4 parts) was added to the slurry and this was passed through a mill several times. The resultant suspension was transferred to a storage tank.

EXAMPLE 29

A solution of an anti-foam agent, tri-n-butyl phosphate (25% vol/vol in methylated spirits; 0.025 parts) in water (22.6 parts) was prepared. To this solution were added sequentially "wet-process" phosphoric acid (27.8 parts), potassium ferrocyanide (0.1 parts) and polyethylene glycol (0.1 parts) (M. Wt. 6000) with agitation. Potassium chloride (24.4 parts) was added. The resultant slurry was passed through a mill several times to reduce the particle size. Calcium hydroxide (19 parts) was introduced with very vigorous agitation, over a period of 10 hours. The pH value of the slurry was then adjusted to 7 by adding small quantities of phosphoric acid and/or calcium hydroxide, as required. Attapulgite clay (6 parts) was added and the slurry passed several times through a mill. The resultant suspension was transferred to a storage tank.

What is claimed is:

1. A process of preparing a suspension fertiliser comprising at least one nutrient material selected from the group consisting of nitrogen-containing nutrient material and phosphorus-containing nutrient material, at least one crystal growth inhibitor selected from the group consisting of ferrocyanide salts, ferricyanide salts, polyphosphates, hexametaphosphates, metavanadates, sulphonated mono-nuclear aromatic compounds, sulphonated bi-nuclear aromatic compounds, sulphonated polynuclear compounds, sulphonated dyes, sulphonated polymers, aminated polymers, polyacrylic acids, borax, cadmium chloride, lead chloride, sorbitol, polyvinyl alcohol, caseinate and soluble starch hydrolysate, potassium chloride, and at least one suspending agent selected from the group consisting of silica and clay, which consists essentially of sequentially performing the steps:

(i) mixing substantially all of said nutrient material with substantially all of said crystal growth inhibitor;

(ii) mixing substantially all of said potassium chloride with the mixture prepared in step (i); and (iii) mixing substantially all of said suspending agent with the mixture prepared in step (ii) so that the mixture obtained in (iii) is the suspension fertilizer, said suspension fertilizer being characterized by its improved storage stability.

2. A process according to claim 1 wherein the mixing of step (iii) is carried out by milling in a colloid mill.

3. A process according to claim 1 wherein the nutrient material is selected from the group consisting of phosphoric acid, triple superphosphate, ammonium phosphate, ammonium nitrate and urea.

4. A process according to claim 3 wherein the nutrient material is "wet-process" phosphoric acid.

5. A process according to claim 1 wherein a ferrocyanide salt is incorporated in step (i) as a crystal growth inhibitor.

6. A process according to claim 1 wherein sodium polyphosphate is incorporated in step (i) as a crystal growth inhibitor.

7. A process according to claim 1 wherein a polymeric additive selected from the group consisting of polyethylene glycol and carboxymethylcellulose salts is incorporated in step (i).

8. A process according to claim 1 wherein the suspending agent in step (iii) is added as a pre-swollen suspension of bentonite.

* * * * *